US012782176B2

(12) United States Patent
Alrabaei et al.

(10) Patent No.: US 12,782,176 B2
(45) Date of Patent: Nov. 3, 2026

(54) DYNAMIC VENTURI FOR MULTIPHASE FLOW METERS

(71) Applicant: SAUDI ARABIAN OIL COMPANY, Dhahran (SA)

(72) Inventors: Rayan Alrabaei, Dhahran (SA); Musa Alnafisah, Tanajib (SA); Mohammed Alkhaldi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 431 days.

(21) Appl. No.: 18/481,123

(22) Filed: Oct. 4, 2023

(65) Prior Publication Data

US 2025/0116541 A1 Apr. 10, 2025

(51) Int. Cl.
*G01F 1/44* (2006.01)
*E21B 47/06* (2012.01)

(52) U.S. Cl.
CPC ................ *G01F 1/44* (2013.01); *E21B 47/06* (2013.01)

(58) Field of Classification Search
CPC .................................................. G01F 1/40–46
See application file for complete search history.

(56) References Cited

U.S. PATENT DOCUMENTS 2,769,397 A * 11/1956 Bolger ..................... F16K 7/07 417/474
3,570,824 A * 3/1971 Strohm ................. F02M 9/103 261/50.1
3,724,503 A * 4/1973 Cooke ..................... F16K 7/061 73/861.63
4,096,211 A * 6/1978 Rameau .................... G01F 1/44 251/5
4,112,757 A * 9/1978 Hayward .................. G01F 1/44 73/861.53
4,538,570 A * 9/1985 Lunt ..................... F02M 9/106 261/44.9
5,554,805 A * 9/1996 Bahrton .................... G01F 1/42 73/861.58
5,736,650 A 4/1998 Hiron et al.
(Continued)

FOREIGN PATENT DOCUMENTS

CN 111750939 B * 6/2022 ............... G01F 1/44

OTHER PUBLICATIONS

English translation of CN-111750939-B (Year: 2022).*

*Primary Examiner* — Alexander A Mercado
(74) *Attorney, Agent, or Firm* — Vorys, Sater, Seymour and Pease LLP

(57) ABSTRACT

A flowmeter includes an inlet for receiving a wellbore fluid therein, an outlet for discharging the wellbore fluid and a stationary outer pipe extending between the inlet and the outlet and exhibiting a first diameter for receiving the wellbore fluid in an unrestricted state. One or more movable walls are coupled within the outer pipe and circumscribe a conical flow path defining an orifice at a downstream end thereof for constricting the wellbore fluid to a restricted state. The movable walls responsive to increasing mass flow rates of the wellbore fluid to expand the orifice and responsive to decreasing mass flow rates of the wellbore fluid to diminish the orifice. At least one sensor is operable to detect a parameter indicative of the pressures of the wellbore fluid in the unrestricted and restricted states.

20 Claims, 5 Drawing Sheets

(56) References Cited

U.S. PATENT DOCUMENTS

| | | | | |
|---|---|---|---|---|
| 6,575,425 | B1 * | 6/2003 | Betz | F16K 7/07 251/5 |
| 6,935,189 | B2 | 8/2005 | Richards | |
| 9,127,799 | B2 | 9/2015 | Brinkmann et al. | |
| 10,996,092 | B2 * | 5/2021 | Keeney-Ritchie | G01F 1/8409 |
| 11,519,767 | B2 * | 12/2022 | Mahalingam | G01B 7/30 |
| 11,630,043 | B2 | 4/2023 | Zhang et al. | |
| 2011/0185805 | A1 * | 8/2011 | Roux | G01F 1/44 73/861.63 |
| 2013/0319103 | A1 * | 12/2013 | Mulford | G01F 1/44 73/152.29 |
| 2021/0025740 | A1 * | 1/2021 | Quin | G01F 15/005 |
| 2022/0357188 | A1 | 11/2022 | Brown et al. | |
| 2023/0392460 | A1 * | 12/2023 | Agu | G01N 15/1459 |
| 2024/0268258 | A1 * | 8/2024 | Eichhorn | G01F 15/003 |

* cited by examiner

DYNAMIC VENTURI FOR MULTIPHASE FLOW METERS

FIELD OF THE DISCLOSURE

The present disclosure relates generally to monitoring multiphase flow in conduits and, more particularly, to obtaining measurements of hydrocarbon mixtures flowing from a subterranean wellbore.

BACKGROUND OF THE DISCLOSURE

Hydrocarbon resources are often located in geologic formations that lie tens of thousands of feet below the earth's surface. In order to extract the hydrocarbon fluid, wellbores may be drilled through the geologic formations to access subterranean hydrocarbon reservoirs. Accurate measurement of hydrocarbon mixtures flowing out of a wellbore (e.g., oil, gas, water, and debris) may facilitate downstream processes such as separation of the hydrocarbon mixtures into single phase components.

One type of multiphase flow meter (MPFM) that may be employed to measure the flow within or from a wellbore is a Venturi flowmeter. A Venturi flow meter generally includes an inlet, an outlet and a chamber defining a flow path between the inlet and the outlet. A converging throat is defined in the chamber that restricts flow and thereby increases a velocity of the flow through the chamber. One or more sensors measure a pressure difference between the restricted and unrestricted flow, from which a total mass rate of the flow may be determined. The throat can be designed in different sizes where the size is determined based on the expected total mass flow rate, and hence, the differential pressure.

It may be difficult to select the optimal throat size for a Venturi flow for use in wellbore applications. For example, selecting an undersized throat size will result in differential pressure values above a maximum operational pressure envelope when fluids with high Gas-Oil ratios (GOR) are tested, and selecting an oversized throat size will result in differential pressure values below an operational pressure range when fluids with low GORs are tested. Since a composition of a fluid flowing from a wellbore may change over time, selecting an optimal throat size may be exceptionally difficult.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a flowmeter includes an inlet for receiving a wellbore fluid therein, an outlet for discharging the wellbore fluid and a stationary outer pipe extending between the inlet and the outlet and defining a first diameter for receiving the wellbore fluid in an unrestricted state. One or more movable walls are coupled within the outer pipe and circumscribing a conical flow path defining an orifice at a downstream end thereof for constricting the wellbore fluid to a restricted state. The movable walls are responsive to increasing mass flow rates of the wellbore fluid to expand the orifice and responsive to decreasing mass flow rates of the wellbore fluid to diminish the orifice. At least one sensor is operable to detect a parameter indicative of the pressures of the wellbore fluid in the unrestricted and restricted states.

According to another embodiment consistent with the present disclosure, a wellbore system includes a wellbore conduit fluidly coupled to a wellbore and operable to receive a wellbore fluid therein. A flowmeter inlet is provided for receiving the wellbore fluid from the wellbore conduit and a flowmeter outlet is provided for discharging the wellbore fluid. A stationary outer pipe extends between the inlet and the outlet and defines a first diameter for receiving the wellbore fluid in an unrestricted state. One or more movable walls are coupled within the outer pipe and circumscribe a conical flow path defining an orifice at a downstream end thereof for constricting the wellbore fluid to a restricted state. The movable walls are responsive to increasing mass flow rates of the wellbore fluid to expand the orifice and responsive to decreasing mass flow rates of the wellbore fluid to diminish the orifice. At least one sensor is operable to detect a parameter indicative of the pressures of the wellbore fluid in the unrestricted and restricted states.

According to yet another embodiment consistent with the present disclosure, a method for measuring a flow of a wellbore fluid includes (a) receiving the wellbore fluid at an inlet of a flowmeter in an unrestricted state, (b) flowing the wellbore fluid through a conical flow path defining an orifice at a downstream end thereof for constricting the wellbore fluid to a restricted state, (c) passively adjusting a size of the orifice by impinging the wellbore fluid on the movable walls circumscribing the conical flow path, (d) detecting at least one parameter of the wellbore fluid indicative of a pressure of the wellbore fluid in the unrestricted and restricted states and (e) determining a flow rate of the wellbore fluid based on the at least one parameter of the wellbore fluid.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
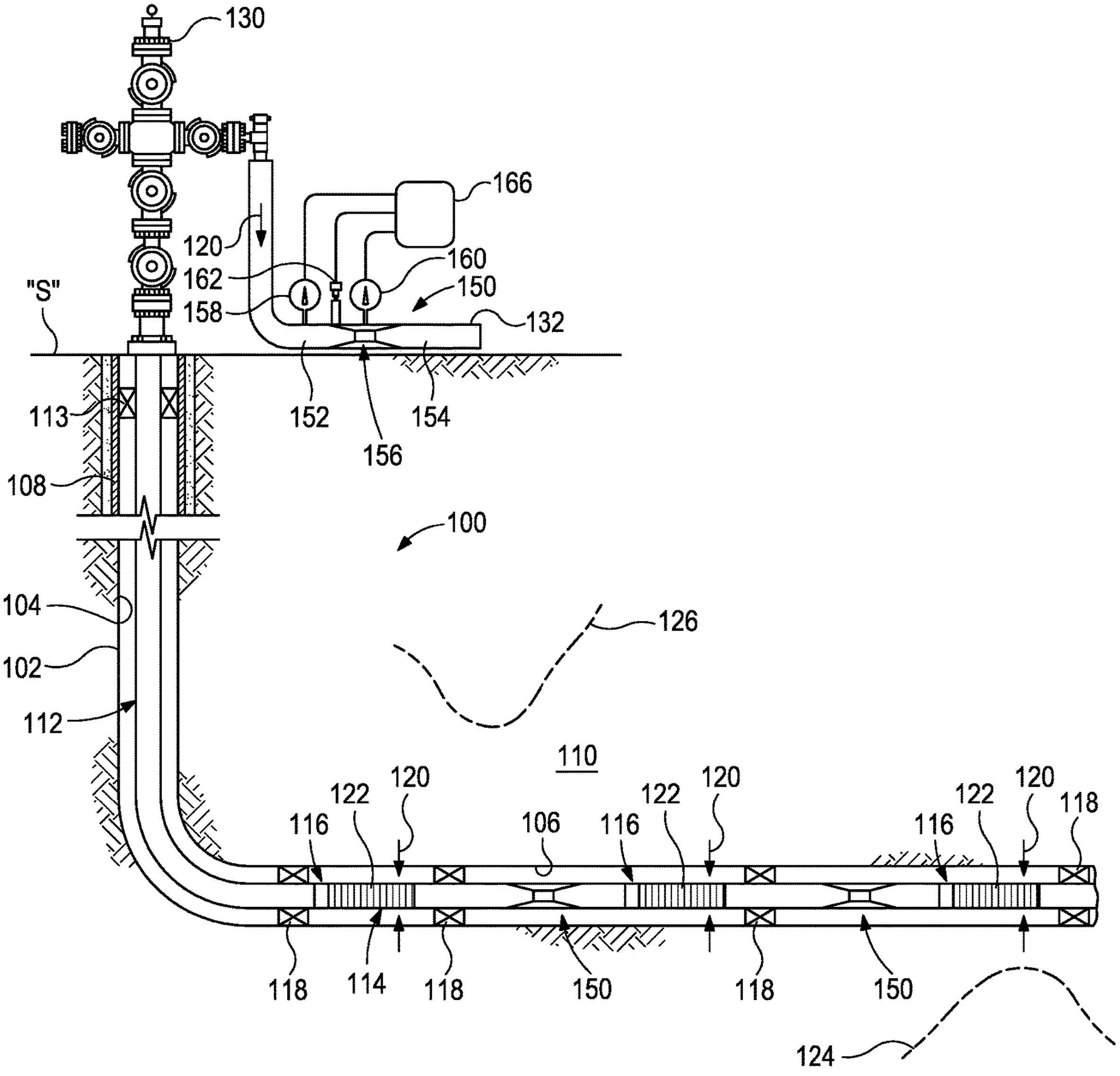
FIG. 1 is a schematic diagram of a wellbore system including a dynamic Venturi flowmeter for monitoring multiphase flow from a wellbore in accordance with one or more aspects of the present disclosure.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to a dynamic Venturi flowmeter for monitoring a multiphase flow from a wellbore. The dynamic Venturi flowmeter has a variable diameter orifice to accommodate a wide range of flow conditions. The orifice may be defined at the end of a conical (converging) flow path that is circumscribed by movable walls. The movable walls may be biased to a first narrow configuration by a radial and longitudinal array of biasing members, e.g., wire springs, foams, elastomers or other elastic materials. The array of biasing members circumscribes the movable walls and provides a uniform and predictable size and shape to the orifice. Increasing mass flow rates through the orifice may passively expand or widen the orifice while decreasing mass flow rates permit the biasing members to diminish or narrow the orifice. In some embodiments, dynamic walls of the orifice may be constructed of a shear-thickening material such that a shear stress imparted to the walls from a fluid flowing therethrough adjusts the size of the orifice.

FIG. 1 is a schematic diagram of an example wellbore system 100 that may employ one or more of the principles of the present disclosure. As depicted, the wellbore system 100 includes a wellbore 102 that extends through various earth strata and has a substantially vertical section 104 that transitions into a substantially horizontal section 106. A portion of the vertical section 104 may have a string of casing 108 cemented therein, and the horizontal section 106 may extend through a hydrocarbon bearing subterranean formation 110. In some embodiments, the horizontal section 106 may be uncompleted and otherwise characterized as an "open-hole" section of the wellbore 102. In other embodiments, however, the casing 108 may extend into the horizontal section 106, without departing from the scope of the disclosure.

A string of production tubing 112 may be positioned within the wellbore 102 and extend from a well surface location "S," such as the Earth's surface. The production tubing 112 provides a conduit for fluids extracted from the formation 110 to travel to the well surface location S for production. A hanger 113 is provided between the production tubing 112 and the casing 108. The hanger 113 may be carried by the production tubing 112 and may include radially expandable teeth or other structures that bite into the casing 108 and thereby hold the production tubing 112 in place within the wellbore 102.

A completion string 114 may be coupled to or otherwise form part of the lower end of the production tubing 112 and arranged within the horizontal section 106. The completion string 114 may be configured to divide the wellbore 102 into various production intervals or "zones" adjacent the subterranean formation 110. To accomplish this, as depicted, the completion string 114 may include a plurality of inflow control devices or "ICDs" 116 axially offset from each other along portions of the production tubing 112. In some embodiments, each inflow control device 116 may be positioned between a pair of wellbore packers 118 that provides a fluid seal between the completion string 114 and the inner wall of the wellbore 102, and thereby defining discrete production intervals or zones.

The inflow control devices 116 are operable to selectively regulate the flow of fluids 120 into the completion string 114 and, therefore, into the production tubing 112. In the illustrated embodiment, each inflow control device 116 includes a sand control screen assembly 122 that filters particulate matter out of the formation fluids 120 originating from the formation 110 such that particulates and other fines are not produced to the well surface location. After passing through the sand control screen assembly 122, the inflow control devices 116 may be operable to regulate the flow of the fluids 120 into the completion string 114. Regulating the flow of fluids 120 into the completion string 114 from each production interval may be advantageous in preventing water coning 124 or gas coning 126 in the subterranean formation 110. Other uses for flow regulation include, but are not limited to, balancing production from multiple production intervals, minimizing production of undesired fluids, maximizing production of desired fluids, etc.

As used herein, the term "fluid" or "fluids" (e.g., the fluids 120) includes liquids, gases, hydrocarbons, multi-phase fluids, mixtures of two of more fluids, water and fluids injected from the surface, such as water. Additionally, references to "water" includes fresh water but should also be construed to also include water-based fluids; e.g., brine or salt water. In accordance with embodiments of the present disclosure, the inflow control devices 116 may have a number of alternative structural features that provide selective operation and controlled fluid flow therethrough.

It should be noted that even though FIG. 1 depicts the inflow control devices 116 as being arranged in an open-hole portion of the wellbore 102, embodiments are contemplated herein where one or more of the inflow control devices 116 is arranged within cased portions of the wellbore 102. Also, even though FIG. 1 depicts a single inflow control device 116 arranged in each production interval, any number of inflow control devices 116 may be deployed within a particular production interval without departing from the scope of the disclosure. In addition, even though FIG. 1 depicts multiple production intervals separated by the packers 118, any number of production intervals with a corresponding number of packers 118 may be used. In other embodiments, the packers 118 may be entirely omitted from the completion interval, without departing from the scope of the disclosure.

Furthermore, while FIG. 1 depicts the inflow control devices 116 as being arranged in the horizontal section 106 of the wellbore 102, the inflow control devices 116 are equally well suited for use in the vertical section 104 or portions of the wellbore 102 that are deviated, slanted, multilateral, or any combination thereof. The use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the wellbore 102.

A wellhead 130 is installed at the surface location "S." The wellhead 130 generally provides a suspension point for the string of casing 108 and the production tubing 112 and also provides pressure control for the wellbore 102. The wellhead 130 may include a system of valves and adaptors that distribute wellbore fluids 120 produced through the production tubing 112 to an appropriate destination. For example, wellbore fluids 120 may be directed from the production tubing 112 through the wellhead 130 to a surface conduit 132, which may extend to a gas-oil separation plant (GOSP), a collection tank, a pipeline or another downstream destination.

In accordance with certain embodiments of the present disclosure, a dynamic Venturi flowmeter 150 may be defined within the surface conduit 132 for monitoring the wellbore fluid 120 exiting the wellbore 102. The flowmeter 150 may include an inlet 152 for receiving a multiphase flow from the wellbore 102 and an outlet 154 defined between the wellhead 130 and the GOSP (not shown) or other downstream destination. The flowmeter 150 may include a chamber 156 defined between the inlet 152 and the outlet 154. As described in greater detail below, the chamber 156 may have one or more or movable sidewalls that are responsive to the wellbore fluid 120 to alter an orifice size of the flowmeter 150.

The flowmeter 150 may include one or more inlet gauges or sensors 158 and one or more throat gauges or sensors 160 operable to detect a parameter indicative of a pressure of the wellbore fluid 120 within the flowmeter 150. The inlet sensors 158 may monitor the unrestricted flow of the wellbore fluid into the inlet 152 while the throat sensors 160 may monitor a restricted flow of the wellbore fluid within the chamber 156. In some embodiments, the flowmeter 150 may also include an orifice gauge or sensor 162 operable to detect a parameter indicative of a position of the movable in the chamber 156 and/or the orifice size of the flowmeter 150. The orifice sensor 162 may include a position sensor, one or more proximity sensors, a displacement sensor or another mechanism recognized in the art. In other embodiments, the orifice sensor 162 may be omitted, without departing from the scope of the disclosure.

The inlet sensor 158, the throat sensor 160 and the orifice sensor 162 may each be communicably coupled to a controller 166 operable to determine a flow rate and/or other characteristics of the wellbore fluid 120 passing through the flowmeter 150. As illustrated in FIG. 1, the controller 166 may be provided at the surface location "S" where an operator may monitor data provided by the sensors 158, 160 and 162. In other embodiments, the controller 166 may be located downhole or at other available locations. In some embodiments, the controller 166 may be a computer-based system that may include a processor, a memory storage device, and programs and instructions, accessible to the processor for executing the instructions utilizing the data stored in the memory storage device. In some embodiments, the controller 166 may also include manual controls and visual displays that may be manipulated and monitored by an operator to ascertain flow characteristics of the wellbore fluid 120 passing through the surface conduit 132.

In accordance with other aspects of the disclosure, one or more dynamic Venturi flowmeters 150 may be provided at select downhole locations. For example, as illustrated in FIG. 1, flowmeters 150 may be provided within the completion string 114 between the inflow control devices 116 to monitor the wellbore fluids 120 entering the wellbore 102 from one or more of the wellbore intervals.

Figure 2A:
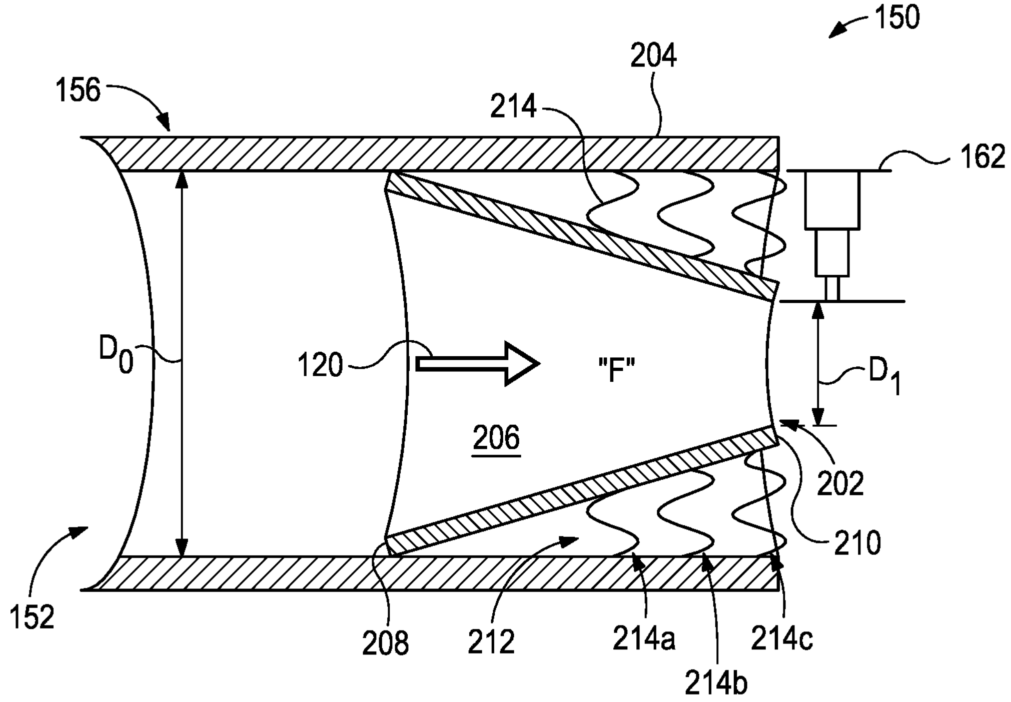
FIGS. 2A and 2B are enlarged, partial cross-sectional side views of the dynamic Venturi flowmeter of FIG. 1 in a first configuration defining a narrow orifice for relatively low mass flow rates, as shown in FIG. 2A, and in a second configuration defining a wide orifice for larger mass flow rates, as shown in FIG. 2B.

Referring to FIG. 2A, the flowmeter 150 is illustrated in a first or "contracted" configuration wherein a narrow orifice 202 is defined to accommodate relatively low mass flow rates of wellbore fluid 120 through the flowmeter 150. The chamber 156 of the flowmeter 150 includes an outer pipe 204, which defines a first diameter DO at the inlet 152. The outer pipe 204 may be a component of, or otherwise fluidly coupled to, the surface conduit 132, the completion string 114, or another pipe associated with the wellbore 102 (FIG. 1). The outer pipe 204 is generally stationary and provides a frame of reference for one or more movable walls 206. The movable walls 206 may be coupled to the outer pipe 204 at an upstream end 208 of the movable walls 206. The upstream end 208 may be hinged, pivotally coupled or otherwise define a flexible connection point between the stationary outer pipe 204 and the movable walls 206. The movable walls 206 extend to a downstream end 210 where the orifice 202 is defined. The movable walls 206 slope radially inwardly (converge) from the upstream end 208 to the downstream end 210 such that a generally conical flow path "F" is defined therethrough. The orifice 202 at the downstream end 210 defines a flow diameter D1, which is generally less than the flow diameter DO at the inlet 152 of the flowmeter 150 such that the movable walls constrict the wellbore fluid into a restricted state.

The movable walls 206 are constructed with certain materials or in certain arrangements that permit movement at both the upstream end 208 and downstream end 210 to dynamically resize the conical flow path "F" and the orifice 202. In a non-limiting example, the movable walls may be fabricated from rolled sheet metal or another flat stock material with edges extending from the upstream end 208 to the downstream end 210*a*, wherein the edges are circumferentially (radially) movable with one another to resize the conical flow path "F" and the orifice 202.

An array 212 of biasing members (generally or collectively, biasing members 214) is provided between the stationary outer pipe 204 and the movable walls 206 to naturally bias the movable walls radially inward. In the illustrated embodiment, the array 212 includes three rings of compression springs 214*a*, 214*b* and 214*c* longitudinally spaced between the upstream end 208 and the downstream end 210 of the movable walls 206. Each ring of compression springs 214*a*, 214*b*, 214*c* substantially circumscribes the movable walls 206 and the conical flow path "F," and may include three or more individual compression springs 214*a*, 214*b*, 214*c* circumferentially spaced around the movable walls 206. The compression springs 214*a*, 214*b*, 214*c* may vary in length along the axial length of the movable walls 206 such that the compression springs 214*c* closer to the downstream end 210 may be longer than the compression springs 214 closer to the upstream end 208. A spring constant or other characteristics of the compression springs 214*a*, 214*b*, 214*c* may be calibrated (selectively adjustable) to suit any particular purpose.

The orifice sensor 162 may be arranged to measure a distance between the downstream end 210 of the movable walls 206 and the outer pipe 204. The orifice sensor 162 may communicate the measured distance to the controller 166 (FIG. 1), which may determine the diameter D1 from the measured distance and the diameter DO of the outer pipe 204. The orifice sensor 162 may be operatively coupled to the outer pipe 204 and to the downstream end 210 of the movable walls 206. In other embodiments, however, the orifice sensor 162 may be a contactless sensor, such as an ultrasonic sensor, which may not physically contact the outer pipe 204 or the movable walls 206.

Figure 2B:
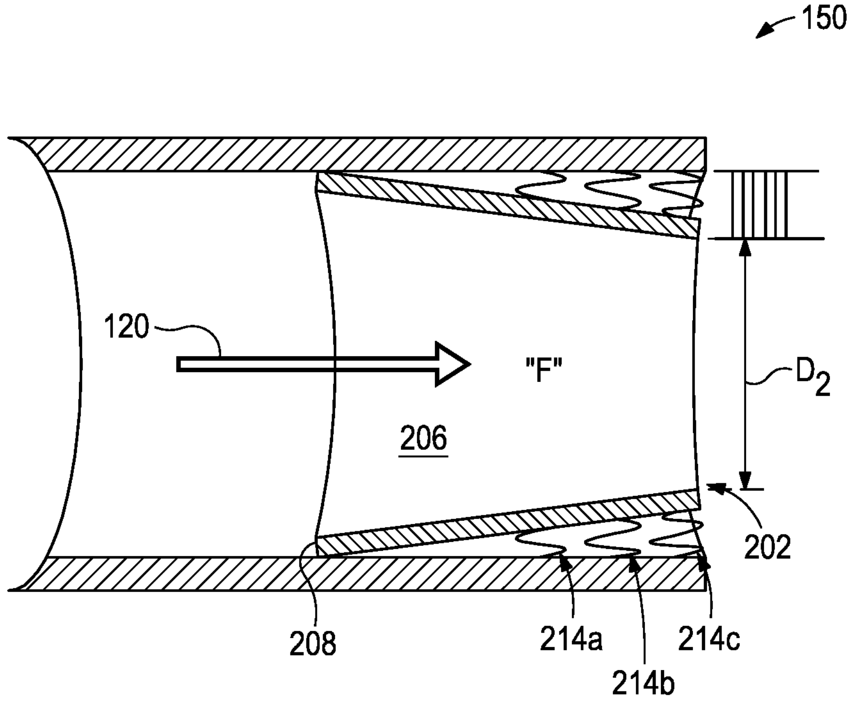

Referring now to FIG. 2B, the flowmeter 150 is illustrated in a second or "expanded" configuration wherein a wide orifice 202 is defined to accommodate relatively large mass flow rates (relative to the configuration of FIG. 2A) through the flowmeter 150. As increasing mass flow rates of wellbore fluid 120 pass through the flowmeter 150, the wellbore fluid 120 impinges on the movable walls 206 and thereby urges the movable walls 206 radially outward and against the bias of the compression springs 214*a*, 214*b*, 214*c*. The orifice 202 thereby widens to a diameter D2 that is greater than the diameter D1 (FIG. 2A). Since the array 212 of compression springs 214*a*, 214*b*, 214*c* substantially circumscribes the flow path "F", the conical shape of the flow path "F" may be maintained and the orifice 202 may be resized in a uniform and predictable manner. The orifice sensor 162 may thus provide reliable measurements from which the diameter D2 may be determined, and the controller 166 (FIG. 1) may provide accurate estimations of the flowrate and other characteristics of the wellbore fluids 120 passing through the flowmeter 150.

Figure 3A:
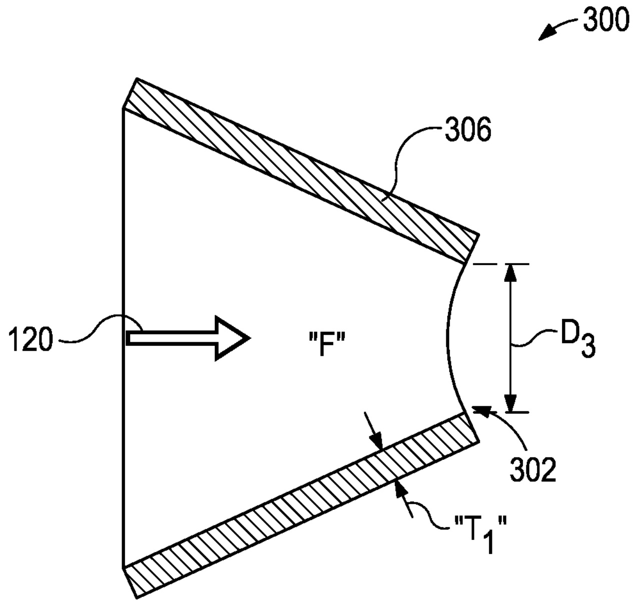
FIGS. 3A and 3B are enlarged, partial cross-sectional side views of an alternate dynamic Venturi flowmeter including a shear-thickening material responsive to a mass flow rate to adjust an orifice size in accordance with one or more aspects of the present disclosure.

Referring now to FIG. 3A an alternate dynamic Venturi flowmeter 300 includes a shear-thickening material responsive to a mass flow rate to adjust an orifice 302 in accordance with one or more aspects of the present disclosure. The shear-thickening material may be employed to construct movable walls 306 of the flowmeter 300. The shear-thickening material may include any fluid, gel, polymer or other material that thickens, e.g., increases in viscosity, when subjected to a shear force. The movable walls 306 circumscribe the conical flow path "F" through which the wellbore fluid 120 may flow. The movable walls 306 generally exhibit a first thickness T1 and define a diameter D3 at the outlet orifice 302 when the wellbore fluid 120 flows with a relatively low mass flow rate as illustrated in FIG. 3A.

Figure 3B:
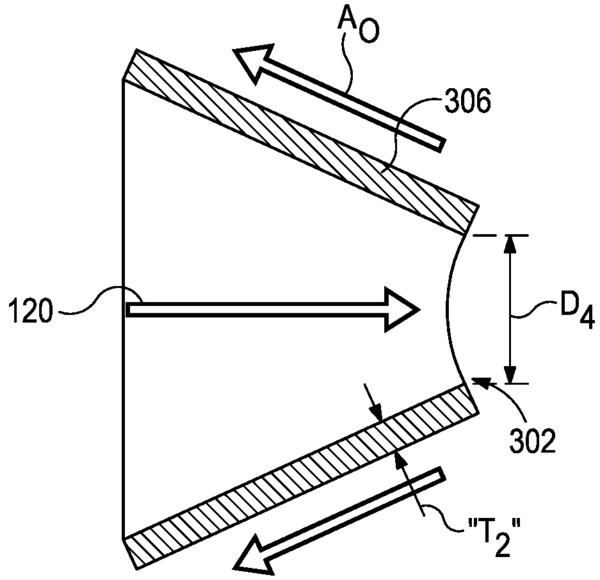

As illustrated in FIG. 3B, however, when the wellbore fluid 120 flows through the conical flow path "F" at a relatively high mass flow rate, the wellbore fluid 120 impinges on the movable walls 306 and causes the movable walls 306 to compress (axially contract) in the direction of arrows A0 and thicken to a second thickness T2. This change in shape of the movable walls 306 in response to increasing mass flow rates therethrough adjusts the orifice 302 to a diameter D4 that is greater than the diameter D3 (FIG. 3A). The movable walls 306 maintain the conical shape of the flow path "F" as the orifice 302 is resized in a uniform and predictable manner.

Figure 4A:
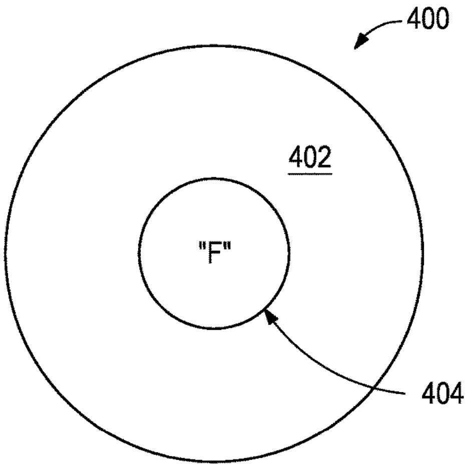
FIGS. 4A through 4D are partial cross-sectional end views of various example dynamic Venturi flowmeters in accordance with one or more aspects of the present disclosure.

Referring to FIGS. 4A through 4D, end views of various example dynamic Venturi flowmeters in accordance with the present disclosure are illustrated. FIG. 4A illustrates a flowmeter 400 wherein a movable wall 402 substantially circumscribes conical flow path "F" and defines orifice 404 at a downstream end thereof. The movable wall 402 may be generally rigid or generally flexible in operation. A more flexible movable wall 402 may be useful for applications where the large variations in mass flow rate are expected and where the orifice 404 may need to be substantially resized. A more rigid movable wall 402 may be useful in applications where a more precise and repeatable measurements may be required.

Figure 4C:
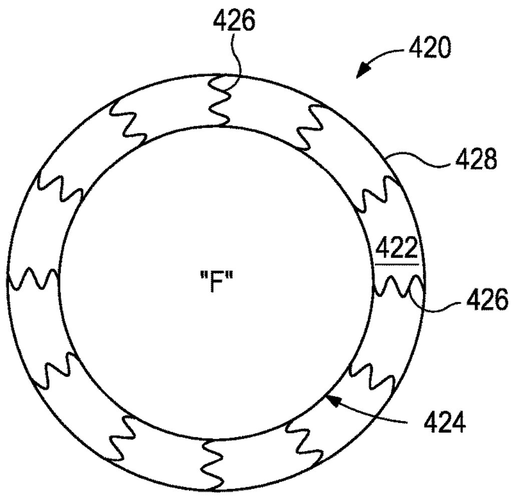
Figure 4B:
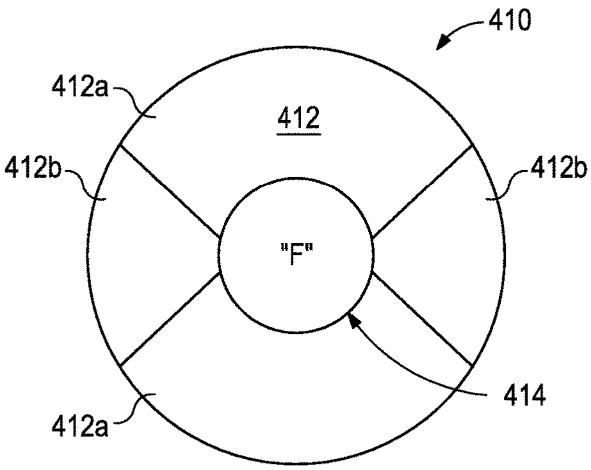

FIG. 4B illustrates a flowmeter 410 wherein a movable wall 412 substantially circumscribes conical flow path "F" and defines orifice 414 at downstream end thereof. The movable wall 412 may be constructed of a plurality of rigid segments 412*a* and a plurality of flexible segments 412*b*. Although the movable wall 412 is illustrated as including four circumferentially alternating rigid and flexible segments 412*a*, 412*b*, any number of segments 412*a*, 412*b* may be provided without departing from the scope of the disclosure.

FIG. 4C illustrates a flowmeter 420 wherein a movable wall 422 substantially circumscribes conical flow path "F" and defines orifice 424 at downstream end thereof. A plurality of biasing members such as wire springs 426 extend between an outer tube 428 and the movable wall 422. The wire springs 426 may be evenly spaced circumferentially around the movable wall 422 and may circumscribe the movable wall 422. In other embodiments (not shown), the wire springs 426 may be unevenly spaced or may spiral around the movable wall 422.

Figure 4D:
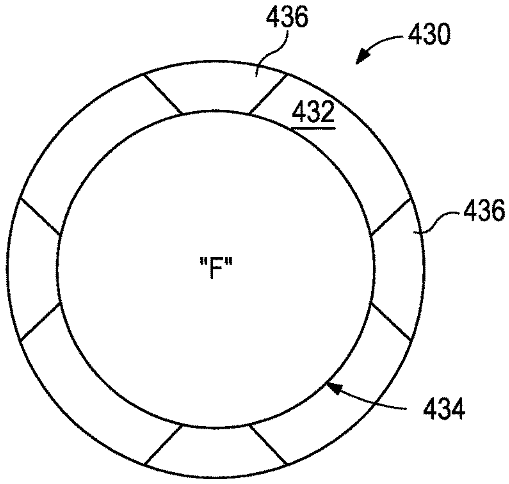

FIG. 4D illustrates a flowmeter 430 wherein a movable wall 432 substantially circumscribes conical flow path "F" and defines orifice 434 at downstream end thereof. A plurality of biasing members such as elastomeric wedges 436 extend between an outer tube 438 and the movable wall 432. The elastomeric wedges 436 may be evenly spaced and may each extend circumferentially in the range of about 10 degrees to about 30 degrees in some embodiments. In other embodiments an elastomeric material may fully circumscribe the movable wall 432.

Figure 5:
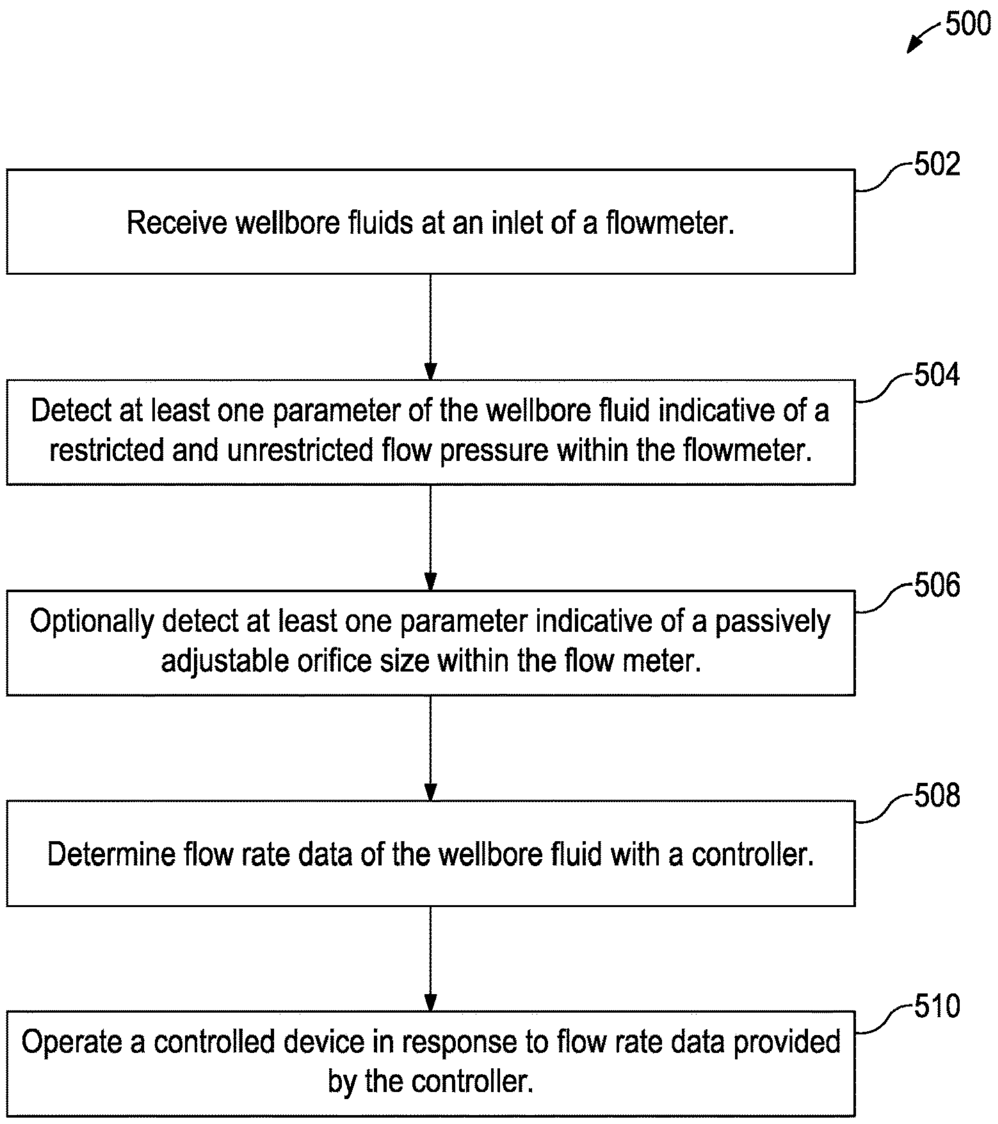
FIG. 5 is schematic flowchart illustrating an example procedure for measuring a multiphase fluid flow with a dynamic Venturi flowmeter in accordance with one or more aspects of the present disclosure.

Referring now to FIG. 5, and with reference to FIGS. 1 through 2B, an example procedure 500 for determining flow rate data using the dynamic Venturi flowmeter 150 is illustrated. Initially at step 502, wellbore fluid 120 is received at the inlet 152 of the flowmeter in an unrestricted state. The inlet 152 may be provided within surface conduit 132, completion string 114 or another conduit fluidly coupled to or associated with the wellbore 102. The wellbore fluid 120 flows through the conical flow path "F" to the orifice 202 where the wellbore fluid 120 is restricted. As the wellbore fluid 120 flows through the conical flow path "F," the wellbore fluid 120 impinges on the movable walls 206 and passively adjusts the size of the orifice 202 appropriately.

Next at step 504, the inlet sensor 158 and throat sensor 160 may detect a pressure of the wellbore fluid 120 in the unrestricted and restricted states. In other embodiments, the sensors may detect a parameter other than pressure from which the restricted and unrestricted flow pressures may be determined. Optionally, at step 506, a parameter indicative of the size of the orifice 202, as passively adjusted by the flow of the wellbore fluid 120, may be detected by the orifice sensor 162. In other embodiments, the size of the orifice 202 may be estimated or determined empirically from data provided by the inlet and throat sensors, for example.

At step 508, a flow rate of the wellbore fluid 120 may be determined with the controller 166 based on data provided by the inlet sensor 158, throat sensor 160 and/or orifice sensor 162. The controller 166 may provide a visual display of the flow rate determined and/or may operate a controlled device based on the flow rate determined (step 510). A controlled device may include a valve on the wellhead 130 or a component of a GOSP or other downstream system (not shown), for example.

Embodiments disclosed herein include:

A. A flowmeter can include an inlet for receiving a wellbore fluid therein, an outlet for discharging the wellbore fluid and a stationary outer pipe extending between the inlet and the outlet and defining a first diameter for receiving the wellbore fluid in an unrestricted state. The flowmeter can further include one or more movable walls are coupled within the outer pipe and circumscribing a conical flow path defining an orifice at a downstream end thereof for constricting the wellbore fluid to a restricted state. The movable walls can be responsive to increasing mass flow rates of the wellbore fluid to expand the orifice and responsive to decreasing mass flow rates of the wellbore fluid to diminish the orifice. The flowmeter can include at least one sensor that is operable to detect a parameter indicative of the pressures of the wellbore fluid in the unrestricted and restricted states.

B. A wellbore system can include a wellbore conduit fluidly coupled to a wellbore and operable to receive a wellbore fluid therein. The wellbore system can further include a flowmeter inlet that is provided for receiving the wellbore fluid from the wellbore conduit and a flowmeter outlet that is provided for discharging the wellbore fluid. The wellbore system can further include a stationary outer pipe that extends between the inlet and the outlet and defines a first diameter for receiving the wellbore fluid in an unrestricted state. The wellbore system can further include one or more movable walls that are coupled within the outer pipe and circumscribe a conical flow path defining an orifice at a downstream end thereof for constricting the wellbore fluid to a restricted state. The movable walls can be responsive to increasing mass flow rates of the wellbore fluid to expand the orifice and responsive to decreasing mass flow rates of the wellbore fluid to diminish the orifice. The wellbore system can further include at least one sensor that is operable to detect a parameter indicative of the pressures of the wellbore fluid in the unrestricted and restricted states.

C. A method for measuring a flow of a wellbore fluid can include (a) receiving the wellbore fluid at an inlet of a flowmeter in an unrestricted state, (b) flowing the wellbore fluid through a conical flow path defining an orifice at a downstream end thereof for constricting the wellbore fluid to a restricted state, (c) passively adjusting a size of the orifice by impinging the wellbore fluid on the movable walls circumscribing the conical flow path, (d) detecting at least one parameter of the wellbore fluid indicative of a pressure of the wellbore fluid in the unrestricted and restricted states and (e) determining a flow rate of the wellbore fluid based on the at least one parameter of the wellbore fluid.

Each of embodiments A, B, and C may have one or more of the following additional elements in any combination: Element 1: further comprising an array of biasing members coupled between the movable walls and the outer pipe to bias the outer walls in a radially inward direction, the array substantially circumscribing the movable walls and the conical flow path. Element 2: wherein the array of biasing members includes a plurality of rings of biasing members longitudinally spaced along the movable walls. Element 3: wherein each ring of biasing members includes a plurality of compression springs, and wherein compression springs closer to the downstream end are longer than compression springs closer to an upstream end of the movable walls. Element 4: wherein the array of biasing members includes a plurality of elastomeric wedges circumferentially spaced around the movable walls. Element 5: wherein the movable walls are constructed of a shear-thickening material. Element 6: further comprising an orifice sensor operable to detect a parameter indicative of a size of the orifice.

Element 7: wherein the wellbore conduit includes a surface conduit extending from a wellhead disposed over the wellbore. Element 8: wherein the wellbore conduit includes a downhole completion string having one or more inflow control devices therein for receiving the wellbore fluid from a geologic formation around the wellbore. Element 9: further comprising a controller operatively coupled to the at least one sensor to determine a flow rate of the wellbore fluid based on data provided by the at least one sensor. Element 10 further comprising an orifice sensor operable to detect a parameter indicative of a size of the orifice, and wherein the controller is operatively coupled to the orifice sensor to determine the flow rate of the wellbore fluid based on data provided by the orifice sensor. Element 11: further comprising an array of biasing members coupled between the movable walls and the outer pipe to bias the outer walls in a radially inward direction, the array substantially circumscribing the movable walls and the conical flow path. Element 12: wherein the array of biasing members includes a plurality of rings of biasing members longitudinally spaced along the movable walls. Element 13: wherein the movable walls are constructed of a shear-thickening material operable to move in response to a shear force applied to the movable walls by the wellbore fluid flowing through the conical flow path.

Element 14: further comprising detecting a parameter indicative of a size of the orifice, and wherein determining the flow rate of the wellbore fluid further includes determining the flow rate of the wellbore fluid based on the parameter indicative of the size of the orifice. Element 15: wherein passively adjusting a size of the orifice includes impinging the wellbore fluid on the movable walls to move the movable walls against a bias of an array of biasing members circumscribing the movable walls. Element 16: wherein passively adjusting a size of the orifice includes impinging the wellbore fluid on the movable walls to apply a shear force to a shear-thickening material forming the movable walls. Element 17: further comprising operating a controlled device in based on the flow rate determined.

By way of non-limiting example, exemplary combinations applicable to A, B, and C include: Element 1 with Element 2; Element 2 with Element 3; Element 1 with Element 4; Element 9 with Element 10; Element 10 with Element 12.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A flowmeter, comprising:

an inlet for receiving a wellbore fluid therein;

an outlet for discharging the wellbore fluid;

a stationary outer pipe extending between the inlet and the outlet and exhibiting a first diameter for receiving the wellbore fluid in an unrestricted state;

one or more movable walls coupled within the outer pipe at an upstream end thereof by a pivotal connection to the stationary outer pipe and circumscribing a conical flow path defining an orifice at a downstream end thereof for constricting the wellbore fluid to a restricted state, the movable walls being responsive to increasing mass flow rates of the wellbore fluid to pivot radially outward and thereby expand the orifice and responsive to decreasing mass flow rates of the wellbore fluid to pivot radially inward and thereby diminish the orifice; and at least one sensor operable to detect a parameter indicative of the pressures of the wellbore fluid in the unrestricted and restricted states.

2. The flowmeter of claim 1, further comprising an array of biasing members coupled between the movable walls and the outer pipe to bias the outer walls in a radially inward direction, the array substantially circumscribing the movable walls and the conical flow path.

3. The flowmeter of claim 2, wherein the array of biasing members includes a plurality of rings of biasing members longitudinally spaced along the movable walls.

4. The flowmeter of claim 3, wherein each ring of biasing members includes a plurality of compression springs, and wherein compression springs closer to the downstream end are longer than compression springs closer to an upstream end of the movable walls.

5. The flowmeter of claim 2, wherein the array of biasing members includes a plurality of elastomeric wedges circumferentially spaced around the movable walls.

6. The flowmeter of claim 1, wherein the movable walls are constructed of a shear-thickening material.

7. The flowmeter of claim 1, further comprising an orifice sensor operable to detect a parameter indicative of a size of the orifice.

8. A wellbore system, comprising:

a wellbore conduit fluidly coupled to a wellbore and operable to receive a wellbore fluid therein;

a flowmeter inlet for receiving the wellbore fluid from the wellbore conduit;

a flowmeter outlet for discharging the wellbore fluid;

a stationary outer pipe extending between the inlet and the outlet and exhibiting a first diameter for receiving the wellbore fluid in an unrestricted state;

one or more movable walls coupled within the outer pipe at an upstream end thereof by a pivotal connection to the stationary outer pipe and circumscribing a conical flow path defining an orifice at a downstream end thereof for constricting the wellbore fluid to a restricted state, the movable walls responsive to increasing mass flow rates of the wellbore fluid to pivot radially outward and thereby expand the orifice and responsive to decreasing mass flow rates of the wellbore fluid to pivot radially inward and thereby diminish the orifice; and at least one sensor operable to detect a parameter indicative of the pressures of the wellbore fluid in the unrestricted and restricted states.

9. The wellbore system of claim 8, wherein the wellbore conduit includes a surface conduit extending from a wellhead disposed over the wellbore.

10. The wellbore system of claim 8, wherein the wellbore conduit includes a downhole completion string having one or more inflow control devices therein for receiving the wellbore fluid from a geologic formation around the wellbore.

11. The wellbore system of claim 8, further comprising a controller operatively coupled to the at least one sensor to determine a flow rate of the wellbore fluid based on data provided by the at least one sensor.

12. The wellbore system of claim 11, further comprising an orifice sensor operable to detect a parameter indicative of a size of the orifice, and wherein the controller is operatively coupled to the orifice sensor to determine the flow rate of the wellbore fluid based on data provided by the orifice sensor.

13. The wellbore system of claim 8, further comprising an array of biasing members coupled between the movable walls and the outer pipe to bias the outer walls in a radially inward direction, the array substantially circumscribing the movable walls and the conical flow path.

14. The wellbore system of claim 13, wherein the array of biasing members includes a plurality of rings of biasing members longitudinally spaced along the movable walls.

15. The wellbore system of claim 8, wherein the movable walls are constructed of a shear-thickening material operable to move in response to a shear force applied to the movable walls by the wellbore fluid flowing through the conical flow path.

16. A method for measuring a flow of a wellbore fluid, the method comprising:

receiving the wellbore fluid at an inlet of a flowmeter in an unrestricted state;

flowing the wellbore fluid through a conical flow path defined by one or more movable walls pivotally coupled at an upstream end thereof to a stationary outer pipe, the conical flow path defining an orifice at a downstream end thereof for constricting the wellbore fluid to a restricted state;

passively adjusting a size of the orifice by impinging the wellbore fluid on the movable walls circumscribing the conical flow path to move the movable walls radially outward in response to increasing mass flow rates and radially inward in response to decreasing mass flow rates;

detecting at least one parameter of the wellbore fluid indicative of a pressure of the wellbore fluid in the unrestricted and restricted states; and determining a flow rate of the wellbore fluid based on the at least one parameter of the wellbore fluid.

17. The method of claim 16, further comprising detecting a parameter indicative of a size of the orifice, and wherein determining the flow rate of the wellbore fluid further includes determining the flow rate of the wellbore fluid based on the parameter indicative of the size of the orifice.

18. The method of claim 16, wherein passively adjusting a size of the orifice includes impinging the wellbore fluid on the movable walls to move the movable walls against a bias of an array of biasing members circumscribing the movable walls.

19. The method of claim 16, wherein passively adjusting a size of the orifice includes impinging the wellbore fluid on the movable walls to apply a shear force to a shear-thickening material forming the movable walls.

20. The method of claim 16, further comprising operating a controlled device in based on the flow rate determined.

* * * * *